(12) United States Patent
Koo et al.

(10) Patent No.: US 9,864,526 B2
(45) Date of Patent: Jan. 9, 2018

(54) WEAR LEVELING USING MULTIPLE ACTIVITY COUNTERS

(71) Applicant: Samsung Electronics Co., Ltd., Suwon-si, Gyeonggi-do (KR)

(72) Inventors: Bum Hoe Koo, Incheon (KR); Nam Wook Kang, Hwaseong-si (KR); In Hwan Doh, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/069,155

(22) Filed: Mar. 14, 2016

(65) Prior Publication Data

US 2016/0274802 A1 Sep. 22, 2016

(30) Foreign Application Priority Data

Mar. 19, 2015 (KR) .......................... 10-2015-0038404

(51) Int. Cl.
*G06F 3/06* (2006.01)

(52) U.S. Cl.
CPC .......... *G06F 3/0616* (2013.01); *G06F 3/0631* (2013.01); *G06F 3/0659* (2013.01); *G06F 3/0679* (2013.01)

(58) Field of Classification Search
CPC .... G06F 3/0616; G06F 3/0631; G06F 3/0659; G06F 3/0679; G06F 2212/7211
USPC .......................................................... 711/103
See application file for complete search history.

(56) References Cited

U.S. PATENT DOCUMENTS

| | | |
|---|---|---|
| 5,341,339 A | 8/1994 | Wells |
| 6,016,275 A | 1/2000 | Han |
| 6,985,992 B1 | 1/2006 | Chang et al. |
| 7,797,481 B2 | 9/2010 | Lee et al. |
| 7,908,423 B2 | 3/2011 | Hsu et al. |
| 8,015,346 B2 | 9/2011 | Chen et al. |
| 8,081,517 B2 | 12/2011 | Kim et al. |
| 8,108,589 B2 | 1/2012 | Yeh et al. |
| 8,223,545 B1 | 7/2012 | Chen et al. |
| 8,335,887 B2 | 12/2012 | Kim et al. |
| 8,671,239 B2 | 3/2014 | Yang et al. |
| 8,762,625 B2 | 6/2014 | Post et al. |
| 2010/0030948 A1 | 2/2010 | Moon et al. |
| 2010/0088461 A1 | 4/2010 | Yang et al. |
| 2011/0238892 A1 | 9/2011 | Tsai et al. |
| 2012/0317337 A1 | 12/2012 | Johar et al. |
| 2013/0159766 A1 | 6/2013 | D'Abreu et al. |

(Continued)

FOREIGN PATENT DOCUMENTS

KR  10-1380602 B1  4/2014

OTHER PUBLICATIONS

Jang et al., "A group based management method of flash memory for enhancing wear-leveling," Aug. 21, 2008, pp. 315-320.

(Continued)

*Primary Examiner* — Than Nguyen
(74) *Attorney, Agent, or Firm* — Harness, Dickey & Pierce, P.L.C.

(57) ABSTRACT

A method of operating a memory controller which controls a non-volatile memory including a plurality of blocks is provided. The method includes determining an operation count for a first block among the plurality of blocks and avoiding successive wear-leveling on the first block based on the determined operation count thereof.

17 Claims, 14 Drawing Sheets

| | W-LV1 T1 | | | W-LV2 T2 | | | W-LV3 T3 | |
|---|---|---|---|---|---|---|---|---|
| BL1 | 143 / 0 | 143 / 0 | ••• | 147 / 0 | 147 / 0 | ••• | 148 / 0 | 148 / 0 |
| BL2 | 47 / 12 | 47 / 12 | ••• | 53 / 6 | 53 / 6 | ••• | 59 / 0 | 59 / 0 |
| BL3 | 4 / 0 | 4 / 20 | ••• | 22 / 2 | 22 / 2 | ••• | 28 / 0 | 28 / 20 |
| BL4 | 26 / 3 | 26 / 3 | ••• | 29 / 0 | 29 / 20 | ••• | 39 / 10 | 39 / 10 |
| ⋮ | ⋮ | ⋮ | ••• | ⋮ | ⋮ | ••• | ⋮ | ⋮ |
| BLn | 121 / 0 | 121 / 0 | ••• | 128 / 0 | 128 / 0 | ••• | 130 / 0 | 130 / 0 |

OC1 / OC2

(56) References Cited

U.S. PATENT DOCUMENTS

| | | |
|---|---|---|
| 2013/0304965 A1 | 11/2013 | Yeh et al. |
| 2014/0019669 A1 | 1/2014 | Nan |
| 2014/0164687 A1 | 6/2014 | Kwon et al. |
| 2014/0181434 A1* | 6/2014 | Chau ................. G06F 12/16 711/162 |
| 2015/0106557 A1* | 4/2015 | Yu ................. G06F 12/0246 711/103 |
| 2016/0070474 A1* | 3/2016 | Yu ................. G06F 3/0608 711/103 |

OTHER PUBLICATIONS

Kim et al., "A Wear-leveling Method for Balanced Multi-chip Life-time NAND Flash-based Storage Devices," School of Electrical and Electronic Engineering, Yonsei University, Jul. 2014, pp. 161-162, Seoul, Republic of Korea.

* cited by examiner

FIG. 4

|  | W-LV1 T1 | | ... | W-LV2 T2 | | ... | W-LV3 T3 | |
|---|---|---|---|---|---|---|---|---|
| BL1 | 143 / 0 | 143 / 0 | ••• | 147 / 0 | 147 / 0 | ••• | 148 / 0 | 148 / 0 |
| BL2 | 47 / 12 | 47 / 12 | ••• | 53 / 6 | 53 / 6 | ••• | 59 / 0 | 59 / 0 |
| BL3 | 4 / 0 | 4 / 20 | ••• | 22 / 2 | 22 / 2 | ••• | 28 / 0 | 28 / 20 |
| BL4 | 26 / 3 | 26 / 3 | ••• | 29 / 0 | 29 / 20 | ••• | 39 / 10 | 39 / 10 |
| ⋮ | ⋮ | ⋮ | ••• | ⋮ | ⋮ | ••• | ⋮ | ⋮ |
| BLn | 121 / 0 | 121 / 0 | ••• | 128 / 0 | 128 / 0 | ••• | 130 / 0 | 130 / 0 |

| | W-LV1<br>T1 ↓ | | ••• | W-LV2<br>T2 ↓ | | ••• | W-LV3<br>T3 ↓ | |
|---|---|---|---|---|---|---|---|---|
| BL1 | 143 / 7 | 143 / 7 | ••• | 145 / 5 | 145 / 5 | ••• | 148 / 2 | 148 / 2 |
| BL2 | 47 / 12 | 47 / 12 | ••• | 50 / 9 | 50 / 9 | ••• | 53 / 6 | 53 / 6 |
| BL3 | 4 / 0 | 4 / 20 | ••• | 14 / 10 | 14 / 10 | ••• | 21 / 3 | 21 / 23 |
| BL4 | 12 / 6 | 12 / 6 | ••• | 16 / 2 | 16 / 22 | ••• | 25 / 13 | 25 / 13 |
| ⋮ | ⋮ | ⋮ | ••• | ⋮ | ⋮ | ••• | ⋮ | ⋮ |
| BLn | 121 / 12 | 121 / 12 | ••• | 128 / 3 | 128 / 3 | ••• | 129 / 2 | 129 / 2 |

|  | W-LV1<br>T1 ↓ | | ••• | W-LV2<br>T2 ↓ | | ••• | W-LV3<br>T3 ↓ | |
|---|---|---|---|---|---|---|---|---|
| PL1 | 8 / 7 | 8 / 7 | ••• | 8 / 9 | 8 / 9 | ••• | 8 / 11 | 8 / 11 |
| PL2 | 7 / 9 | 7 / 9 | ••• | 7 / 10 | 8 / 10 | ••• | 8 / 13 | 8 / 13 |
| PL3 | 9 / 7 | 9 / 7 | ••• | 9 / 8 | 9 / 8 | ••• | 9 / 10 | 9 / 10 |
| PL4 | 6 / 6 | 7 / 6 | ••• | 7 / 12 | 7 / 12 | ••• | 7 / 13 | 8 / 13 |
| ⋮ | ⋮ | ⋮ | ••• | ⋮ | ⋮ | ••• | ⋮ | ⋮ |
| PLm | 8 / 6 | 8 / 6 | ••• | 8 / 9 | 8 / 9 | ••• | 8 / 12 | 8 / 12 |

PSC / M_EC

FIG. 10

|      | W-LV1 T1 |     | ... | W-LV2 T2 |      | ... | W-LV3 T3 |      |
|------|------|------|-----|------|------|-----|-------|-------|
| PL1  | 9 / 4 | 9 / 4 | ... | 9 / 4 | 10 / 4 | ... | 10 / 8 | 10 / 8 |
| PL2  | 7 / 6 | 7 / 6 | ... | 7 / 7 | 7 / 7 | ... | 7 / 8 | 7 / 8 |
| PL3  | 8 / 8 | 8 / 8 | ... | 8 / 9 | 8 / 9 | ... | 8 / 10 | 8 / 10 |
| PL4  | 5 / 6 | 6 / 6 | ... | 6 / 8 | 6 / 8 | ... | 6 / 9 | 7 / 9 |
| ⋮    | ⋮    | ⋮    | ... | ⋮    | ⋮    | ... | ⋮     | ⋮     |
| PLm  | 8 / 7 | 8 / 7 | ... | 8 / 9 | 8 / 9 | ... | 8 / 11 | 8 / 11 |

PSC / M_EC

WEAR LEVELING USING MULTIPLE ACTIVITY COUNTERS

CROSS-REFERENCE TO RELATED APPLICATION

This application claims priority under 35 U.S.C. §119(a) from Korean Patent Application No. 10-2015-0038404 filed on Mar. 19, 2015, the disclosure of which is hereby incorporated by reference in its entirety.

BACKGROUND

Example embodiments of the inventive concepts relate to memory controllers, and more particularly, to methods of operating a memory controller for preventing successive wear-leveling operations on one block among a plurality of blocks included in non-volatile memory (e.g., flash memory), data storage devices capable of performing the same, and/or data processing systems capable of performing the same.

Wear-leveling refers to techniques designed to prolong life of a flash memory and/or prevent performance deterioration of the flash memory by configuring blocks in the flash memory to be uniformly used. In conventional wear-leveling techniques, erase counts for respective blocks are compared and data of a block having a high erase count is mapped to a block having a low erase count and data of the block having the low erase count is mapped to the block having the high erase count according to the comparison result. A program/erase operation is frequently performed on a block having the lowest erase count according to the wear-leveling result, and therefore, the erase count of the block increases. As a result, the erase counts, i.e., usage frequencies of the respective blocks can be uniformly maintained.

When wear-leveling is frequently performed in a certain situation, wear-leveling may be undesirably and consecutively or repetitively performed on a block that has just been subjected to the wear-leveling. Despite the fact that an erase count of the block on which wear-leveling has already been performed will increase because a program/erase operation is frequently performed on the block, wear-leveling is consecutively or repetitively performed on the block. According to the consecutive or repetitive wear-leveling, data with respect to which the program/erase operation is frequently performed may be mapped to the block having a high erase count, thereby, increasing a difference in usage frequencies among blocks.

Furthermore, when wear-leveling is concentrated in blocks included in a certain bank among a plurality of banks during wear-leveling, an unbalance of the number of available blocks among the banks may occur. This unbalance leads to the occurrence of garbage collection, which may result in deterioration of performance of a data storage device.

SUMMARY

According to an example embodiment of the inventive concepts, a method of operating a memory controller which controls a non-volatile memory including a plurality of blocks includes determining an operation count for each of the plurality of blocks and avoiding successive wear-leveling on the first block based on the determined operation count. The operation count may include a first count related to a number of erase operations on the first block and a second count related to wear-leveling on the first block.

The determining an operation count may include setting a reference value and the avoiding successive wear-leveling may include preventing wear-leveling on the first block until the second count has reached the reference value.

The method may further include increasing the first count each time an erase operation is performed on the first block and changing the second count each time the wear-leveling is performed on the first block. The changing the second count may include increasing the second count by a reference count.

The method may further include changing the second count each time when the erase operation is performed on the first block.

The changing the second count each time the erase operation is performed on the first block may include decreasing the second count every time the erase operation is performed.

The method may further include selecting, if none of the plurality of blocks reaches a reference value, a second block having a minimum operation count among the plurality of blocks and controlling execution of wear-leveling on the second block. The operation count may be a sum of a first count related to the number of erase operations on each of the blocks and a second count related to wear-leveling on each of the blocks. The wear-leveling on the selected block may be performed by a flash translation layer (FTL).

According to an example embodiment of the inventive concepts, a data storage device includes a non-volatile memory including a plurality of blocks, a volatile memory configured to store operation counts for the blocks, and a memory controller electrically connected with the non-volatile memory and the volatile memory and configured to determine an operation count for a first block among the blocks and avoid successive wear-leveling on the first block based on the determined operation count thereof.

According to an example embodiment of the inventive concepts, a method of operating a memory controller, which controls a non-volatile memory including a plurality of blocks, includes determining operation counts with respect to the blocks, each of the operation counts including a first count and a second count, the first count relating to a number of erase operations on a corresponding one of the blocks, the second count relating to wear-leveling on the corresponding one of the blocks, and prohibiting the wear-leveling on a selected block from among the blocks based on the first count and the second count of the selected block, increasing the first count of the selected block each time an erase operation is performed on the selected block, and changing the second count of the selected block each time wear-leveling or an erase operation is performed on the selected block.

BRIEF DESCRIPTION OF THE DRAWINGS

The above and other features and advantages of the inventive concepts will become more apparent by describing in detail some example embodiments thereof with reference to the attached drawings in which:

FIG. 4 is a diagram of an operation performed by the memory controller illustrated in FIGS. 1 and 2 to select a block to be subjected to wear-leveling, according to some example embodiments of the inventive concepts;

FIG. 5 is a diagram of an operation performed by the memory controller illustrated in FIGS. 1 and 2 to select a block to be subjected to wear-leveling according to other example embodiments of the inventive concepts;

FIG. 9 is a diagram of an operation performed by the memory controller illustrated in FIGS. 1 and/or 2 to select a plane that includes a block to be subjected to wear-leveling, according to some example embodiments of the inventive concepts;

FIG. 10 is a diagram of an operation performed by the memory controller illustrated in FIGS. 1 and/or 2 to select a plane that includes a block to be subjected to wear-leveling, according to other example embodiments of the inventive concepts;

DETAILED DESCRIPTION OF THE EMBODIMENTS

Figure 1:
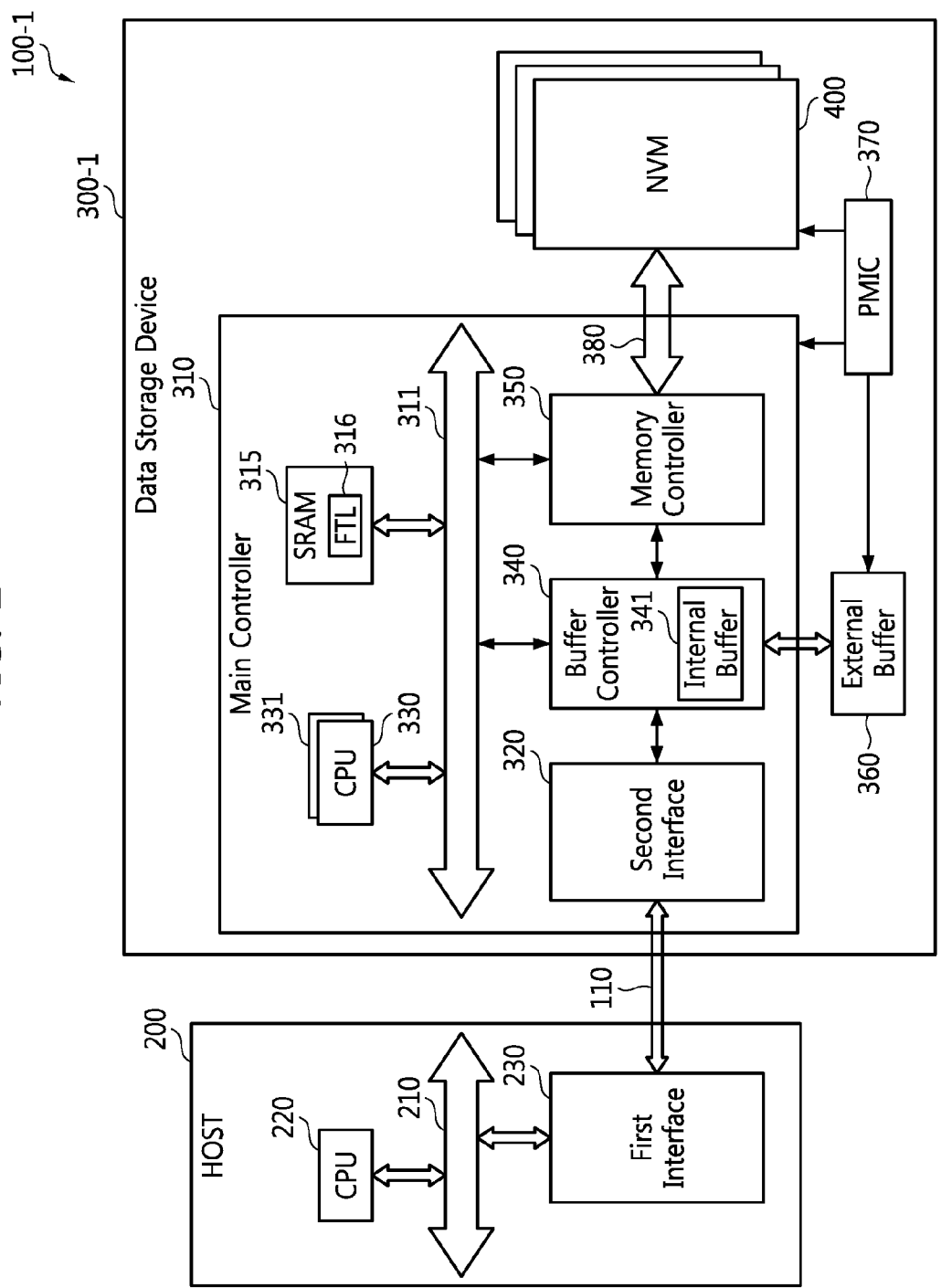
FIG. 1 is a schematic block diagram of a data processing system according to some example embodiments of the inventive concepts.

The inventive concepts now will be described more fully hereinafter with reference to the accompanying drawings, in which various example embodiments of the inventive concepts are shown. This inventive concepts may, however, be embodied in many different forms and should not be construed as limited to the example embodiments set forth herein. Rather, these example embodiments are provided so that this disclosure will be thorough and complete, and will fully convey the scope of the inventive concepts to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular example embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concepts belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Meanwhile, when it is possible to implement any example embodiment in any other way, a function or an operation specified in a specific block may be performed differently from a flow specified in a flowchart. For example, two consecutive blocks may actually perform the function or the operation simultaneously, and the two blocks may perform the function or the operation conversely according to a related operation or function.

Expressions such as "at least one of," when preceding a list of elements, modify the entire list of elements and do not modify the individual elements of the list.

Example embodiments of inventive concepts can be embodied as hardware, software, or combinations of hardware and software. Example embodiments of inventive concepts can also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. Also, functional programs, codes, and code segments according to example embodiments of inventive concepts can be construed by programmers having ordinary skill in the art to which example embodiments of inventive concepts pertain.

The example embodiments as disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

The hardware devices may also include one or more storage devices. The one or more storage devices may be computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments as described above. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

Hereinafter, some example embodiments will be explained in further detail with reference to the accompanying drawings.

FIG. 1 is a schematic block diagram of a data processing system according to some example embodiments of the inventive concepts. A data processing system 100-1 may include a host 200 and a data storage device 300-1 which can communicate commands and/or data with the host 200 through a main interface 110.

The data processing system 100-1 may be a personal computer (PC), a workstation, a data center, an internet data center, a storage area network (SAN), a network attached storage (NAS), or a mobile computing device, but it is not restricted thereto. The mobile computing device may be, for example, a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, or an e-book.

The main interface 110 may be a serial advanced technology attachment (SATA) interface, a SATA express (SATAe) interface, a SAS (serial attached small computer system interface (SCSI)), a peripheral component interconnect express (PCIe) interface, a non-volatile memory express (NVMe) interface, an advanced host controller interface (AHCI), a NAND-type flash memory interface, or a multimedia card (MMC) interface, but the main interface 110 is not restricted thereto. The main interface 110 may transmit electrical signals and/or optical signals.

The host 200 may control a data processing operation (e.g., a write (or program) operation or a read operation) of the data storage device 300-1 via the interface 110. The host 200 may refer to a host controller.

In the host 200, a central processing unit (CPU) 220 may communicate commands and/or data with a first interface 230 via bus architecture 210. The block diagram of the host 200 illustrated in FIG. 1 is just an example and the inventive concepts are not restricted to the block diagram illustrated in FIG. 1.

The host 200 may be an integrated circuit (IC), a motherboard, a system on chip (SoC), an application processor (AP), a mobile AP, or a database server, but the host 200 is not restricted thereto. The bus architecture 210 may be implemented as advanced microcontroller bus architecture (AMBA), an advanced high-performance bus (AHB), an advanced peripheral bus (APB), an advanced extensible interface (AXI), an advanced system bus (ASB), or a combination thereof, but the inventive concepts are not restricted to these examples.

The CPU 220 may generate a write request for controlling a write operation of the data storage device 300-1 or a read request for controlling a read operation of the data storage device 300-1. The write request may include a write address and the read request may include a read address. The CPU 220 may include at least one core. The request may refer to a command.

The first interface 230 may change formats of a command and/or data and transmit the changed command and/or data to the data storage device 300-1 through the main interface 110. The first interface 230 may also change formats of a response and/or data received from the data storage device 300-1 and transmit the changed response and/or data to the CPU 220 via the bus architecture 210. The first interface 230 may include a transceiver which transmits and receives a command and/or data. Structures and operations of the first interface 230 may be implemented to be suitable to (or to be compatible with) structures and operations of the main interface 110.

The data storage device 300-1 may include a main controller 310, an external buffer 360, a power management IC (PMIC) 370, and non-volatile memories 400. The data storage device 300-1 may be a flash-based memory device but is not restricted thereto. The data storage device 300-1 may be a solid-state drive or solid-state disk (SSD), an embedded SSD (eSSD), a universal flash storage (UFS), an MMC, an embedded MMC (eMMC), or managed NAND memory, but the data storage device 300-1 is not restricted to these examples. The flash-based memory device may be, for example, a NAND-type flash memory device or a NOR-type flash memory device.

The main controller 310 may control commands and/or data transferred between the host 200, the external buffer 360, and the non-volatile memories 400. The main controller 310 may be implemented in IC or SoC.

The main controller 310 may include bus architecture 311, an internal memory 315, a second interface 320, at least one CPU 330 and/or 331, a buffer controller 340, and a memory controller 350. The bus architecture 311 may be implemented as AMBA, AHB, APB, AXI, ASB, or a combination thereof, but the inventive concepts are not restricted to these examples.

The internal memory 315 may store data used for the operations of the main controller 310 or data generated from the data processing operation (e.g., a write operation or a read operation) performed by the main controller 310. The internal memory 315 may be random access memory (RAM), dynamic RAM (DRAM), static RAM (SRAM), buffer, buffer memory, cache, or tightly coupled memory (TCM), but it is not restricted thereto.

The internal memory 315 may store a flash translation layer (FTL) 316 loaded from at least one of the non-volatile memories 400. The FTL 316 may be a software layer for performing address mapping in which a logical address output from the host 200 is mapped to a physical address of the non-volatile memories 400, wear-leveling, and/or garbage collection.

The second interface 320 may change formats of a response and/or data, and transmit the changed response and/or data to the host 200 via the main interface 110. Further, the second interface 320 may receive a command and/or data from the host 200, may change formats of the command and/or data, and transmit the changed command and/or data to the at least one CPU 330 and/or 331 and/or the buffer controller 340. The second interface 320 may include a transceiver which transmits and receives signals and/or data in some example embodiments.

Structures and operations of the second interface 320 may be implemented to be suitable to (or to be compatible with) the structures and operations of the main interface 110. The second interface 320 may be SATA interface, SATAe interface, SAS, PCIe interface, NVMe interface, AHCI, MMC interface, NAND-type flash memory interface, or NOR-type flash memory interface, but the second interface 320 is not restricted thereto.

The at least one CPU 330 and/or 331 may control the internal memory 315, the second interface 320, the buffer controller 340, and the memory controller 350 via the bus architecture 311. The CPU 330 or 331 may include at least one core. The at least one CPU 330 and/or 331 may also control the PMIC 370. In some example embodiments, the first CPU 330 may be configured to control operations with the host 200 via the second interface 320 and the second CPU 331 may be configured to control operations with the non-volatile memories 400 via the memory controller 350. The first and second CPUs 330 and 331 may form a multi-CPU. The first CPU 330 may control the second CPU 331, but the inventive concepts are not restricted to the foregoing example embodiments.

The buffer controller 340 may write data to or read data from the external buffer 360 according to the control of the first CPU 330 or the second CPU 331. The buffer controller 340 may be referred to as a controller or a buffer manager which controls a write operation and a read operation on the external buffer 360. For example, when a write command from the host 220 is processed, the buffer controller 340 may temporarily store write data transmitted from the host 200 in the external buffer 360 in response to the write command and transmit the write data from the external buffer 360 to the non-volatile memories 400 through the memory controller 350.

The buffer controller 340 may include an internal buffer 341. The buffer controller 340 may also temporarily store data read from the non-volatile memories 400 in response to a read command transmitted from the host 200 and transmit the read data to the host 200 via the second interface 320. The internal buffer 341 may be a volatile memory, e.g. SRAM, but is not restricted thereto.

The memory controller 350 may control data processing operations (e.g., write operations or read operations) on the non-volatile memories 400 according to the first CPU 330 or the second CPU 331. For instance, when the non-volatile memories 400 are flash memories, the memory controller 350 may function as a flash memory controller. The memory controller 350 may communicate control signals and/or data with the non-volatile memories 400 through channels 380.

The memory controller 350 may control wear-leveling on one block among a plurality of blocks included in each of the non-volatile memories 400. When the wear-leveling is performed on the block, the FTL 316 may map a logical address relevant to hot data to the physical address of the block. The hot data may refer to data frequently updated (e.g., programmed and/or erased) by the host 200. The wear-leveling may be performed using the FTL 316. The memory controller 350 may support SATA interface, SATAe interface, SAS, PCIe interface, NVMe interface, AHCI, MMC interface, NAND-type flash memory interface, or NOR-type flash memory interface, but the inventive concepts are not restricted to these examples.

The buffer controller 340 may write data to the external buffer 360 or read data from the external buffer 360. The external buffer 360 may be RAM, SRAM, or DRAM, but is not restricted thereto.

The external buffer 360 may store, for example, a mapping table for logical-to-physical address translation for the non-volatile memories 400 and an operation count for each of a plurality of blocks included in the non-volatile memories 400. The mapping table may be updated by the FTL 316. The operation count may include, for example, a first count related to the number of erase operations on a block and a second count related to a wear-leveling operation on the block. The external buffer 360 may function as a cache that temporarily stores write data to be transmitted to the non-volatile memories 400.

According to some example embodiments, the external buffer 360 may store a plane selection count for each of a plurality of planes included in each of the non-volatile memories 400. The plane selection count may be related to the number of times each of blocks included in a plane has been selected to be subjected to wear-leveling. The external buffer 360 may stores a minimum erase count for each of the planes. The minimum erase count may be related to the minimum count among erase counts for respective blocks included in the plane.

When the main controller 310 and the external buffer 360 are formed in different semiconductor chips, respectively, the main controller 310 and the external buffer 360 may be packaged into a single package using package-on-package (PoP), multi-chip package (MCP), or system-in package (SiP), but the inventive concepts are not restricted to these examples. For example, a first chip including the external buffer 360 may be stacked above a second chip including the main controller 310 using stack balls. The PMIC 370 may control operating voltages applied to the main controller 310, the external buffer 360, and/or the non-volatile memories 400.

The non-volatile memories 400 may include a plurality of banks. Each of the banks may include a plurality of planes. Each of the planes may include a plurality of blocks.

Figure 2:
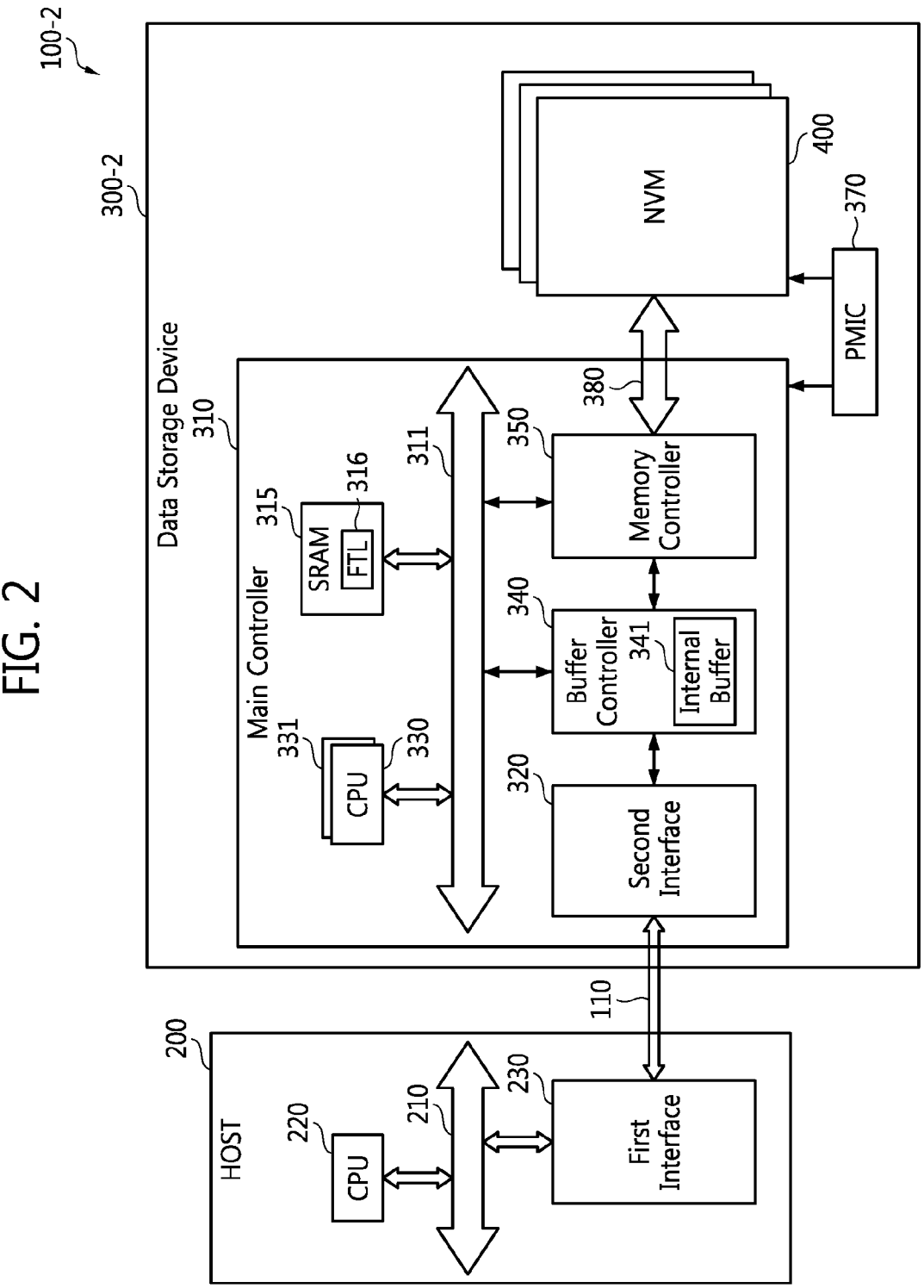
FIG. 2 is a schematic block diagram of a data processing system according to other example embodiments of the inventive concepts.

FIG. 2 is a schematic block diagram of a data processing system according to other example embodiments of the inventive concepts. Referring to FIG. 2, a data processing system 100-2 may include a host 200 and a data storage device 300-2 which are connected with each other via the main interface 110. Unlike the data storage device 300-1 illustrated in FIG. 1, the data storage device 300-2 illustrated in FIG. 2 does not include an external buffer. The operations of the main controller 310 illustrated in FIG. 1 may be substantially the same as or similar to those of the main controller 310 illustrated in FIG. 2. The data storage device 300-2 may be a DRAMless data storage device, e.g. a DRAMless SSD.

The data processing system 100-2 may be implemented as a mobile computing device, for example, a cellular phone, a smart phone, a tablet PC, a PDA, an EDA, a digital still camera, a digital video camera, a PMP, a PND, a handheld game console, a MID, a wearable computer, an IoT device, an IoE device, or an e-book.

Figure 3:
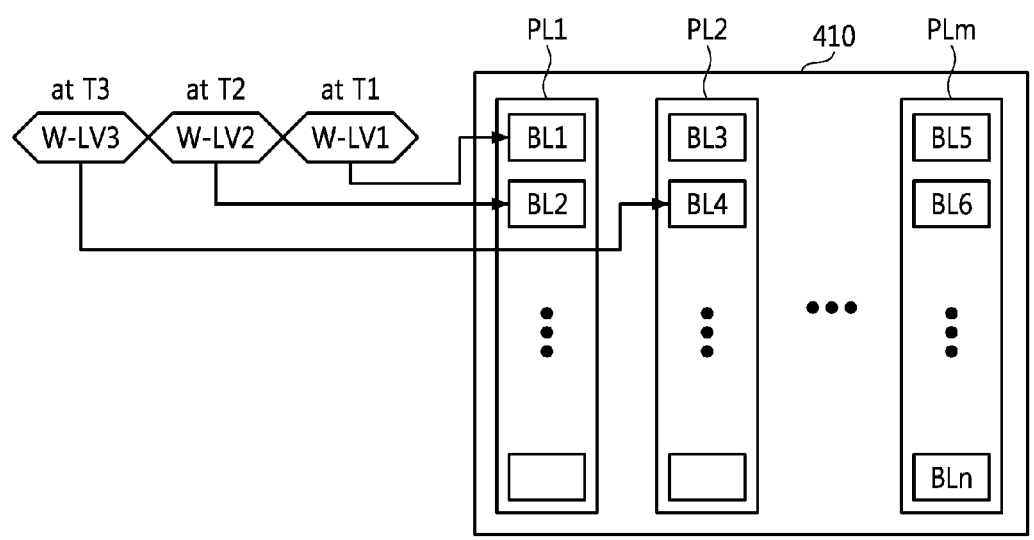
FIG. 3 is a conceptual diagram of wear-leveling operations on blocks in a non-volatile memory illustrated in FIGS. 1 and 2.

FIG. 3 is a conceptual diagram of wear-leveling operations on blocks in the non-volatile memories 400 illustrated in FIGS. 1 and 2. Although only one bank 410 is illustrated in FIG. 3, each of the non-volatile memories 400 may include a plurality of banks. Structures and operations may be substantially the same or similar among the banks, and therefore, the operations of the bank 410 will be described representatively.

Referring to FIGS. 1 through 3, the bank 410 may include a plurality of planes PL1 through PLm, where "m" is a natural number of at least 3. Each of the planes PL1 through PLm may include a plurality of blocks.

The memory controller 350 may control wear-leveling on one block among a plurality of blocks BL1 through BLn. The memory controller 350 may determine an operation count for each of the blocks BL1 through BLn and may select one block from among the blocks BL1 through BLn according to the determination result. The operation count may include a first count related to the number of erase operations on a block and a second count related to wear-leveling on the block. The operation of the memory controller 350 selecting one of the blocks BL1 through BLn based on the operating count will be described in detail with reference to FIGS. 4 and 5.

At a first time point T1, the memory controller 350 may control a first wear-leveling operation W-LV1 on the first block BL1. When the first wear-leveling operation W-LV1 is performed on the first block BL, the first block BL1 is mapped by the FTL 316 to a block that stores hot data, and therefore, the numbers of program operations and erase operations on the first block BL1 may increase. As a result, the first count for the first block BL may also increase.

At a second time point T2 following the first time point T1, the memory controller 350 may select not the first block BL1 but the second block BL2 for a second wear-leveling operation W-LV2 even though the first count for the first block BL1 is the lowest one. As the first wear-leveling operation W-LV1 is performed on the first block BL1, the first block BL1 is mapped to the block that stores hot data, and therefore, the first count for the first block BL1 may increase with the increase of the number of program operations and erase operations on the first block BL1.

At a third time point T3 following the second time point T2, the memory controller 350 may select not the second block BL2 but the fourth block BL4 for a third wear-leveling operation W-LV3 even though the first count for the second block BL2 is the lowest one. As the second wear-leveling operation W-LV2 is performed on the second block BL2, the second block BL2 is mapped to the block that stores hot data, and therefore, the first count for the second block BL2 may increase with the increase of the number of program operations and erase operations on the second block BL2.

FIG. 4 is a diagram of an operation performed by the memory controller 350 illustrated in FIGS. 1 and 2 to select a block to be subjected to wear-leveling according to some example embodiments of the inventive concepts. Although random numbers are shown in FIGS. 4 and 5, the inventive concepts are not restricted to these numbers. Wear-leveling operations W-LV1, W-LV2, and W-LV3 illustrated in FIGS. 4 and 5 may occur in succession. For example, no wear-leveling may be performed between the first and second wear-leveling operations W-LV1 and W-LV2 and no wear-leveling may be performed between the second and third wear-leveling operations W-LV2 and W-LV3.

Referring to FIGS. 1, 2, and 4, the memory controller 350 may determine an operation count for each of the blocks BL through BLn at a time point T1. The memory controller 350 may select a block having a first count OC1 that is lowest from among blocks having a second count OC2 that has a reference value (e.g., "0") and may control the execution of the first wear-leveling operation W-LV1 on the selected block.

For example, the second count OC2 for the blocks BL1, BL3, and BLn has the reference value and the first counts OC1 for the respective blocks BL1, BL3, and BLn are 143, 4, and 121, respectively, at the time point T1. Therefore, the memory controller 350 may control the execution of the first wear-leveling operation W-LV1 on the third block BL3. The second count OC2 for the block BL3 subjected to the first wear-leveling operation W-LV may be changed. For example, when the first wear-leveling operation W-LV is performed on the third block BL3, the second count OC2 for the third block BL3 may be increased by a reference count. Here, it is assumed that the reference count is 20, but the value of the reference count may be changed. The reference count is desired to have a number that is sufficient to prohibit successive wear-leveling on the recently wear-leveled block for a while.

An erase operation may be performed on the blocks BL1 through BLn between first and second time points T1 and T2. The first count OC1 for a block subjected to the erase operation may be changed. Although the first count OC1 increases by 1 every time the erase operation is performed in the example embodiments illustrated in the drawings, the first count OC1 may be changed in various ways in other example embodiments.

The second count OC2 for a block subjected to the erase operation may also be changed. Here, the second count OC2 decreases by 1 every time the erase operation is performed in the example embodiments illustrated in the drawings, but the inventive concepts are not restricted to these example embodiments.

In some example embodiments, when the erase operation is performed on a block having the second count OC2 of the reference value, the second count OC2 may not be changed. The changes of the first count OC1 and the second count OC2 will be described in detail with reference to FIG. 6.

FIG. 5 is a diagram of an operation performed by the memory controller 350 illustrated in FIGS. 1 and 2 to select a block to be subjected to wear-leveling according to other example embodiments of the inventive concepts. Referring to FIG. 5, at second and third time points T2 and T3, there are no blocks having the second count OC2 of the reference value among the blocks BL1 through BLn. In this case, the memory controller 350 may select a block for which the sum of the first count and the second count is a minimum value and may control the execution of wear-leveling on the selected block. For example, at the second time point T2, the fourth block BL4 is a block for which the sum of the first count OC1 and the second count OC2 is a minimum value. In such a case, the memory controller 350 may control the execution of the second wear-leveling operation W-LV2 on the fourth block BL4.

When the second wear-leveling operation W-LV2 is performed on the fourth block BL4, the second count OC2 for the fourth block BL4 may increase by a reference count. For instance, when the second count OC2 for the fourth block BL4 is 2 before the second wear-leveling operation W-LV2 and the reference count is 20, the second count OC2 for the fourth block BL4 may increase to 22.

At the third time point T3, the third block BL3 is a block for which the sum of the first count OC1 and the second count OC2 is a minimum value. In such a case, the memory controller 350 may control the execution of the third wear-leveling operation W-LV3 on the third block BL3. When the third wear-leveling operation W-LV3 is performed on the third block BL3, the second count OC2 for the third block BL3 may increase from 3 to 23.

In the example embodiment illustrated in FIG. 5, a block to be subjected to wear-leveling is selected based on the sum of the first count OC1 and the second count OC2 when there are no blocks having the second count OC2 of the reference value. However, a block to be subjected to wear-leveling may be selected using the sum of the first count OC1 and the second count OC2 regardless of the reference value according to some example embodiments.

Figure 6:
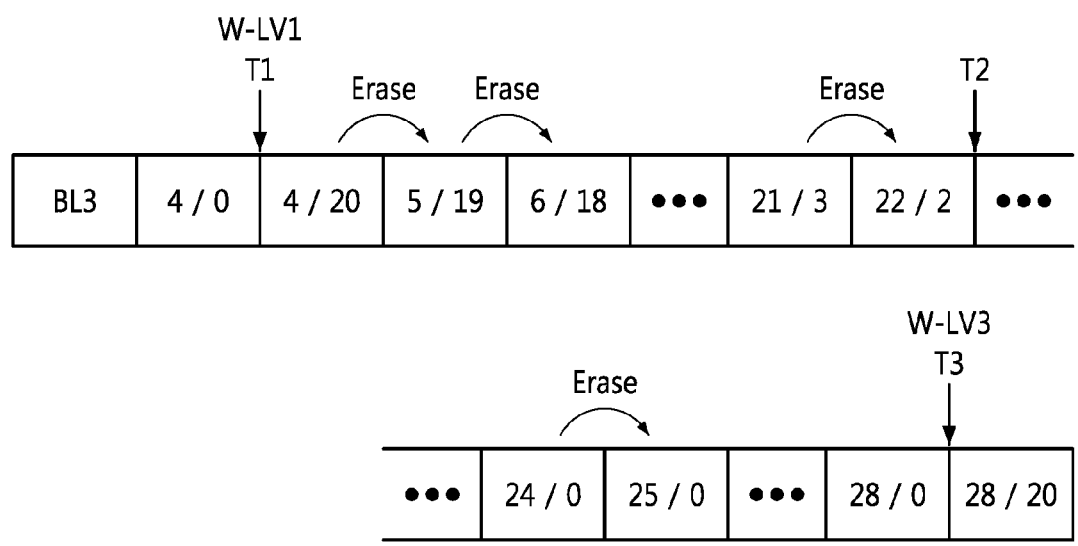
FIG. 6 is a diagram of an operation in which an operation count of the block illustrated in FIG. 4 is changed, according to some example embodiments of the inventive concepts.

FIG. 6 is a diagram of an operation in which an operation count of the block BL3 illustrated in FIG. 4 is changed, according to some example embodiments of the inventive concepts. For convenience' sake in the description, only the change of the operation count for the third block BL3 is illustrated in FIG. 6, but this change may also be applied to all blocks BL1 through BLn in the same or similar manner. Referring to FIGS. 4 and 6, when the first wear-leveling operation W-LV1 is performed on the third block BL3 at the first time point T1 and the third wear-leveling operation W-LV3 is performed on the third block BL3 at the third time point T3, the second count OC2 may increase by the reference count (e.g., 20) each time when an wear-leveling operation is performed on the third block BL3.

The first count OC1 of the third block BL3 may be changed every time when an erase operation is performed on the third block BL3. For instance, the first count OC1 of the third block BL3 may be increased by 1 every time when the erase operation is performed on the third block BL3. Further, the second count OC2 of the third block BL3 may be changed every time when the erase operation is performed on the third block BL3. For instance, the second count OC2 of the third block BL3 may be decreased by, for example, 1. However, the inventive concepts are not restricted to the current example embodiments. When the second count OC2 of the third block BL3 is equal to the reference value (e.g., 0), the second count OC2 of the third block BL3 may not be changed even though the erase operation is performed.

Figure 7:
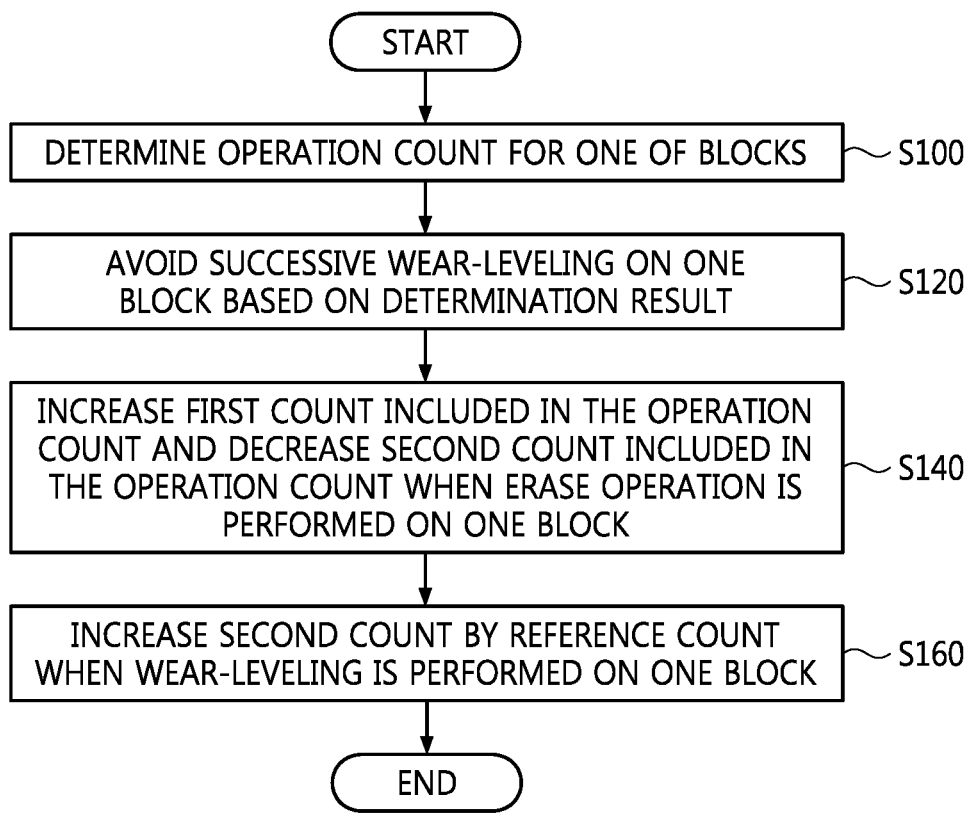
FIG. 7 is a flowchart of an operation of the memory controller illustrated in FIG. 4, according to an example embodiment.

FIG. 7 is a flowchart of an operation of the memory controller 350 illustrated in FIG. 4, according to an example embodiment. Referring to FIGS. 1, 2, 4, 6, and 7, the memory controller 350 may determine an operation count for one block (e.g., the third block BL3) among a plurality of the blocks BL1 through BLn included in each of the non-volatile memories 400 in operation S100. The operation count may include the first count OC1 related to the number of erase operations on the third block BL3 and the second count OC2 related to wear-leveling on the third block BL3.

The memory controller 350 may avoid successive wear-leveling on the one block based on the determination result in operation S120. For example, when the first wear-leveling operation W-LV1 is performed on the third block BL3 at the first time point T1 and the second wear-leveling operation W-LV2 is performed at the second time point T2 in succession to the first wear-leveling operation W-LV1, the memory controller 350 may control the second wear-leveling operation W-LV2 to be performed on a block (e.g., the fourth block BL4) other than the third block BL3 when the second count OC2 of the third block BL3 is not equal to the reference value even when the first count OC1 of the third block BL3 is a minimum value. In other words, the memory controller 350 may select a block for which the first count OC1 is lowest from among blocks having the second count OC2 of the reference value to be subjected to wear-leveling.

The memory controller 350 may change the first count OC1 of the block every time when an erase operation is performed on the block in operation S140. The memory controller 350 may also change the second count OC2 of the block every time when an erase operation is performed on the block in operation S140. For instance, the memory controller 350 may increase the first count OC1 and decrease the second count OC2 every time when an erase operation is performed on the block. When the second count OC2 is equal to the reference value, the memory controller 350 may not change the second count OC2 even though the erase operation is performed.

The memory controller 350 may change the second count OC2 every time when wear-leveling is performed on the block in operation S160. For instance, the memory controller 350 may increase the second count OC2 by the reference count every time when wear-leveling is performed.

In other words, the second count OC2 of a block on which wear-leveling is performed is increased by the reference count when wear-leveling is performed on the block. the memory controller 350 may be configured to prohibit successive wear-leveling on the block, which has been subjected to wear-leveling, until the second count OC2 of the block becomes equal to the reference value.

Figure 8:
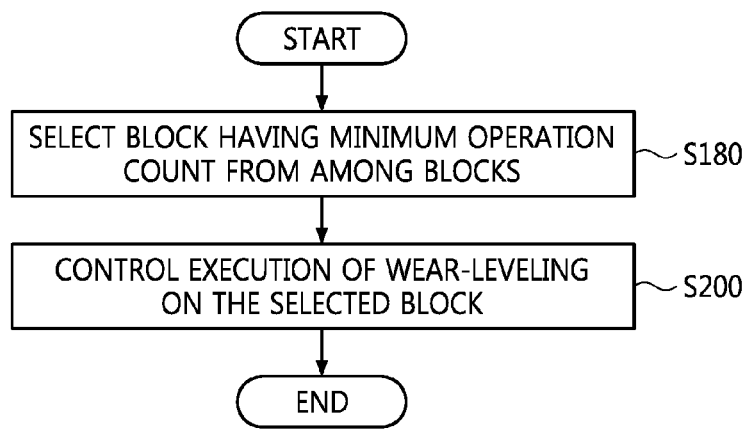
FIG. 8 is a flowchart of an operation of the memory controller illustrated in FIG. 5, according to an example embodiment.

FIG. 8 is a flowchart of an operation of the memory controller 350 illustrated in FIG. 5, according to an example embodiment. Referring to FIGS. 1 and 2 and FIGS. 4 through 8, the memory controller 350 may determine the operation count for each of the blocks BL1 through BLn and may select a block having the minimum operation count to be subjected to wear-leveling in operation S180 and may control the execution of the wear-leveling on the selected block in operation S200. The operation count may be the sum of the first count OC1 and the second count OC2.

For instance, referring to FIG. 5, there are no blocks having the second count OC2 of the reference value (e.g., "0") at the second time point T2, and the memory controller 350 may control the execution of the second wear-leveling operation W-LV2 on the fourth block BL4 for which the sum of the first count OC1 and the second count OC2 is a minimum value. According to some other example embodiments, the memory controller 350 may control the execution of wear-leveling on the block for which the sum of the first count OC1 and the second count OC2 is a minimum value regardless of the value of the second count OC2.

FIG. 9 is a diagram of an operation performed by the memory controller 350 illustrated in FIGS. 1 and/or 2 to select a plane that includes a block to be subjected to wear-leveling according to some example embodiments of the inventive concepts. Random numerals are used in the example embodiments illustrated in FIGS. 9 and 10 and the inventive concepts are not restricted to these example embodiments. The wear-leveling operations W-LV1, W-LV2, and W-LV3 illustrated in FIGS. 9 and 10 are performed in succession. In other words, no wear-leveling is performed between the first and second wear-leveling operations W-LV and W-LV2 and between the second and third wear-leveling operations W-LV2 and W-LV3.

Referring to FIGS. 1, 3, and 9, the memory controller 350 may select a plane having a minimum plane selection count PSC from among planes PL1 through PLm and may control the execution of wear-leveling on a block having a minimum erase count among blocks included in the selected plane.

At the first time point T1, the memory controller 350 may select the fourth plane PL4 having the plane selection count PSC which is minimum and may control the execution of the first wear-leveling operation W-LV1 on a block corresponding to a minimum erase count M_EC among the blocks included in the fourth plane PL4. The data storage device 300-1 or 300-2 may store information about a block having the minimum erase count M_EC in each of the planes PL1 through PLm.

The plane selection count PSC and the minimum erase count M_EC may be stored in the external buffer 360 of the data storage device 300-1 or in the internal buffer 341 of the data storage device 300-2. When the first wear-leveling operation W-LV1 is performed, the plane selection count PSC of the fourth plane PL4 may be changed. For instance, the plane selection count PSC may be increased by 1, but the inventive concepts are not restricted to this example.

At the second time point T2, the second and fourth planes PL2 and PL4 have the minimum plane selection count PSC. The memory controller 350 may select the second plane PL2, which has the minimum erase count M_EC between the second and fourth planes PL2 and PL4 and execute the second wear-leveling operation W-LV2 on a block corresponding to the minimum erase count M_EC among the blocks included in the second plane PL2.

At the third time point T3, the memory controller 350 may select the fourth plane PL4, which has the minimum plane selection count PSC. The memory controller 350 may control the execution of the third wear-leveling operation W-LV3 on a block corresponding to the minimum erase count M_EC among the blocks included in the fourth plane PL4.

Consequently, the memory controller 350 may control the planes PL1 through PLm to be uniformly selected to be subjected to wear-leveling using information about the number of times each plane has been selected to be subjected to wear-leveling. As a result, an unbalance of the number of valid blocks among the planes may be reduced and the occurrence of garbage collection may be decreased.

FIG. 10 is a diagram of an operation performed by the memory controller 350 illustrated in FIGS. 1 and/or 2 to select a plane that includes a block to be subjected to wear-leveling according to other example embodiments of the inventive concepts. Referring to FIGS. 9 and 10, an operation of selecting a plane including a block to be subjected to the first wear-leveling operation W-LV1 and an operation of selecting a plane including a block to be subjected to the third wear-leveling operation W-LV3 are substantially the same as those described with reference to FIG. 9.

Referring to FIG. 10, at the second time point T2, the memory controller 350 may select the first plane PL1 having the lowest minimum erase count M_EC when the difference between the highest minimum erase count M_EC, which is for the third plane PL3, and the lowest minimum erase count M_EC, which is for the first plane PL1, is at least a reference difference (e.g., 5). The memory controller 350 may control the execution of the second wear-leveling operation W-LV2 on a block corresponding to the minimum erase count M_EC in the first plane PL1.

In other words, when the difference between the highest minimum erase count for one plane and the lowest minimum erase count for another plane is equal to or greater than the reference difference, the plane having the lowest minimum erase count may be selected even though the plane selection count PSC of the selected plane is not a minimum value and wear-leveling is performed on a block having the minimum erase count among blocks included in the selected plane.

Figure 11:
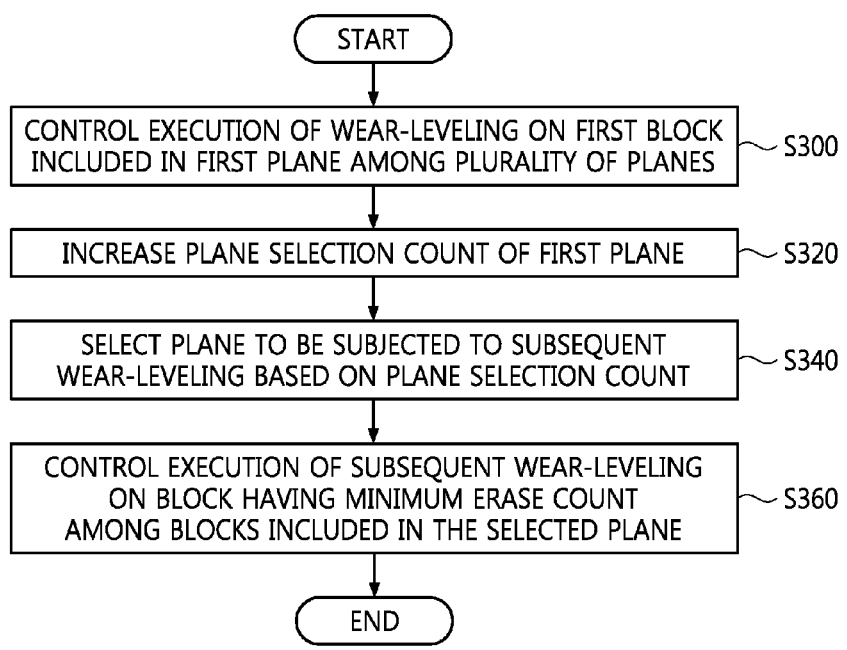
FIG. 11 is a flowchart of an operation of the memory controller illustrated in FIG. 9.

FIG. 11 is a flowchart of an operation of the memory controller 350 illustrated in FIG. 9. Referring to FIGS. 1 through 3 and FIGS. 9 and 11, the memory controller 350 may control the execution of wear-leveling on the first block BL1 included in the first plane PL1 among the planes PL1 through PLm in operation S300.

When the wear-leveling is performed, the memory controller 350 may change the plane selection count PSC of the first plane PL1 in operation S320. The memory controller 350 may increase the plane selection count PSC of the first plane PL1, but the inventive concepts are not restricted to the current embodiments. The memory controller 350 may select a plane including a block to be subjected to subsequent wear-leveling based on the plane selection count PSC of each of the planes PL1 through PLm in operation S340 and may control the execution of the subsequent wear-leveling on a block having a minimum erase count among blocks included in the selected plane in operation S360. The memory controller 350 may select a plane having the minimum plane selection count.

According to some other example embodiments (not shown in the flow chart), the memory controller 350 may determine a difference between the highest minimum erase count for a plane and the lowest minimum erase count for another plane regardless of the plane selection count PSC. When the difference in the minimum erase count is equal to or greater than a reference difference, the memory controller

350 may select the plane having the lowest minimum erase count and may control the execution of a subsequent wear-leveling on a block corresponding to the minimum erase count among blocks included in the selected plane.

Figure 12:
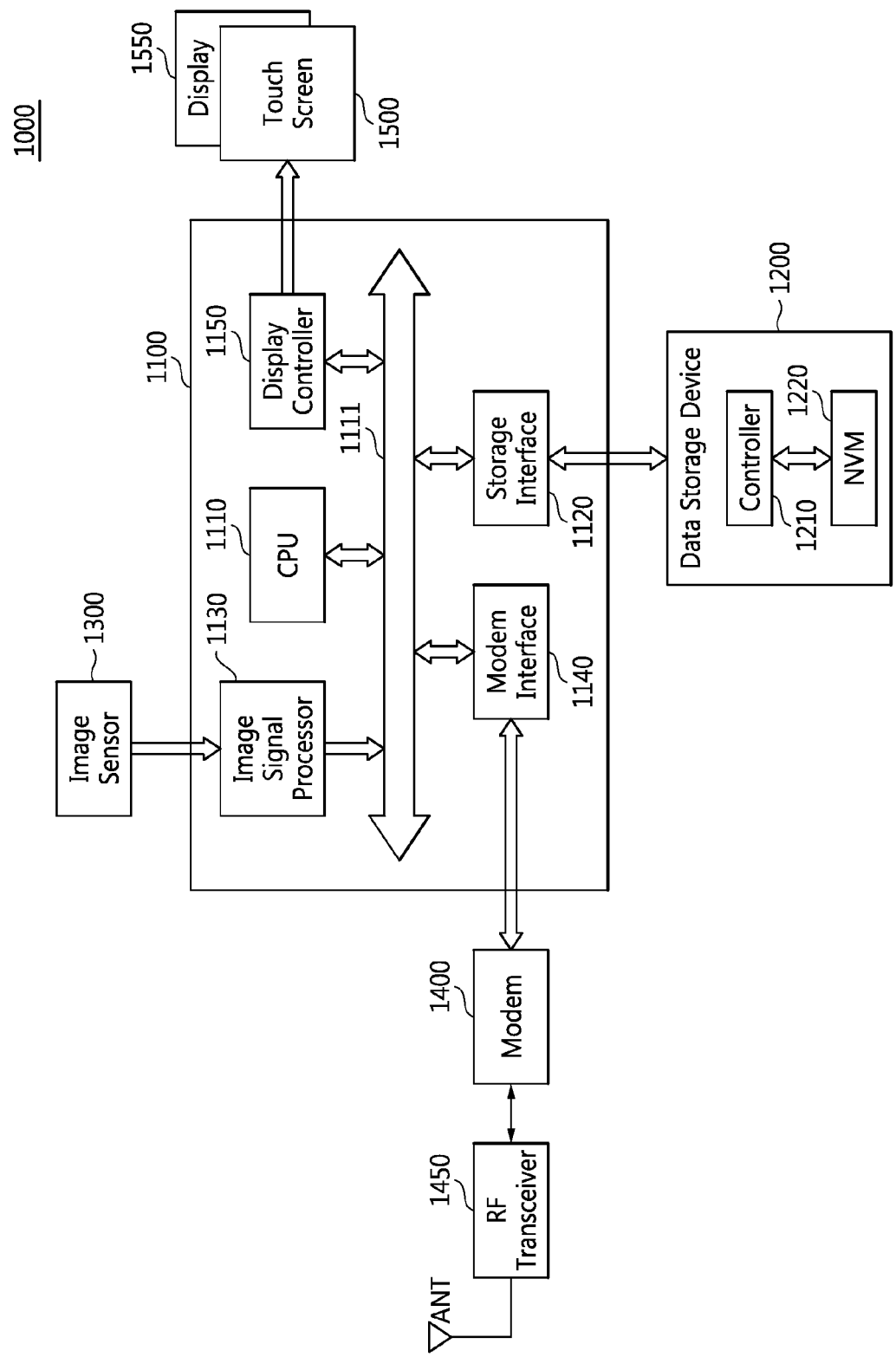
FIG. 12 is a block diagram of a data processing system according to an example embodiment of the inventive concepts.

FIG. 12 is a block diagram of a data processing system 1000 according to an example embodiment of the inventive concepts. Referring to FIGS. 1 through 12, the data processing system 1000 may be a mobile computing device. The mobile computing device may be a laptop computer, a cellular phone, a smart phone, a tablet PC, a PDA, an EDA, a digital still camera, a digital video camera, a PMP, a PND, a handheld game console, a MID, a wearable computer, an internet of things (IoT) device, an internet of everything (IoE) device, or an e-book. The data processing system 1000 may include an application processor (AP) 1100, a data storage device 1200, an image sensor 1300, a modem 1400, a radio frequency (RF) transceiver 1450, and a display 1550 including a touch screen 1500.

The data storage device 1200 may refer to the data storage device 300-1 or 300-2 illustrated in FIG. 1 or 2. The data storage device 1200 may include a controller 1210 and a non-volatile memory (NVM) 1220. The controller 1210 may refer to the main controller 310 illustrated in FIG. 1 or 2 and the NVM 1220 may refer to an NVM 400 illustrated in FIG. 1. The image sensor 1300 may convert an optical image into an electrical signal to generate image data.

The RF transceiver 1450 may transmit radio data received through an antenna ANT to the modem 1400. The RF transceiver 1450 may convert data output from the modem 1400 into radio data and may transmit the radio data through the antenna ANT to an external device. The modem 1400 may process data transferred between the RF transceiver 1450 and the AP 1100.

The AP 1100 may control the data storage device 1200, the image sensor 1300, the modem 1400, the RF transceiver 1450, the touch screen 1500, and/or the display 1550. The AP 1100 may be implemented as an IC, a SoC, or a mobile AP.

The AP 1100 may include a CPU 1110, bus architecture 1111, a storage interface 1120, an image signal processor 1130, a modem interface 1140, and a display controller 1150. The CPU 1110 may control the storage interface 1120, the image signal processor 1130, the modem interface 1140, and the display controller 1150. The bus architecture 1111 may be implemented as AMBA, AHB, APB, AXI, or ASB, but the inventive concepts are not restricted to these examples.

The storage interface 1120 may control processing and/or transmission of data communicated with the data storage device 1200 according to the control of the CPU 1110. The image signal processor 1130 may receive and process image data output from the image sensor 1300 and transmit the processed image to the bus architecture 1111. The modem interface 1140 may control processing and/or transmission of data communicated with the modem 1400 according to the control of the CPU 1110.

The display controller 1150 may transmit data to be displayed to the display 1550 according to the control of the CPU 1110. The display controller 1150 and the display 1550 may communicate data with each other using, for example, mobile industry processor interface (MIPI®) display serial interface. According to some example embodiments, the display controller 1150 and the display 1550 may communicate data with each other using embedded DisplayPort (eDP).

The touch screen 1500 may transmit a user input for controlling the operation of the data processing system 1000 to the AP 1100. The user input may be generated by touching the touch screen 1500 of the data processing system 1000. The CPU 1110 may control the operations of the AP 1100, the image sensor 1300, and/or the display 1550 according to the user input transmitted from the touch screen 1500.

Figure 13:
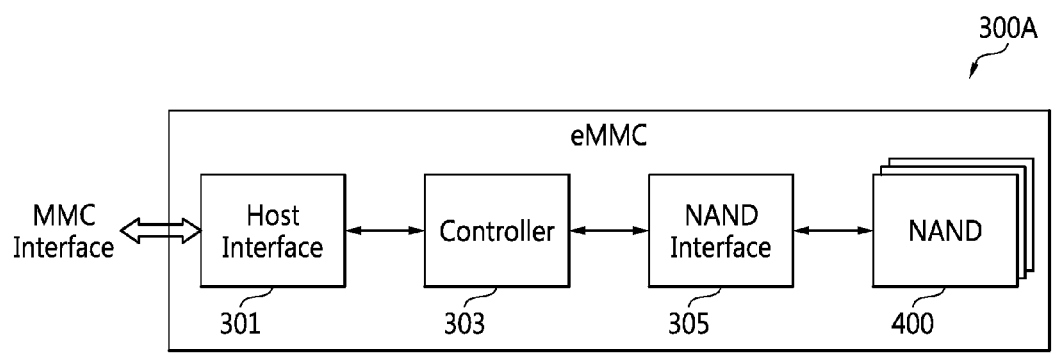
FIG. 13 is a block diagram of a data processing system according to another example embodiment of the inventive concepts.

FIG. 13 is a block diagram of a data processing system according to another example embodiment of the inventive concepts. Referring to FIG. 13, a data processing system 300A may be implemented as an eMMC. The data processing system 300A may include a host interface 301, a controller 303, a NAND interface 305, and an NVM 400.

The host interface 301 may control commands and/or data transferred between the controller 303 and a host (now shown). The host interface 301 may be connected to the host via an MMC interface. The controller 303 may control the operations of the data processing system 300A. A structure including the controller 303 and the NAND interface 305 may be substantially the same as or similar to the structure of the main controller 310 illustrated in FIG. 1 or 2. The controller 303 may control the operations of the NVM 400 via the NAND interface 305.

Figure 14:
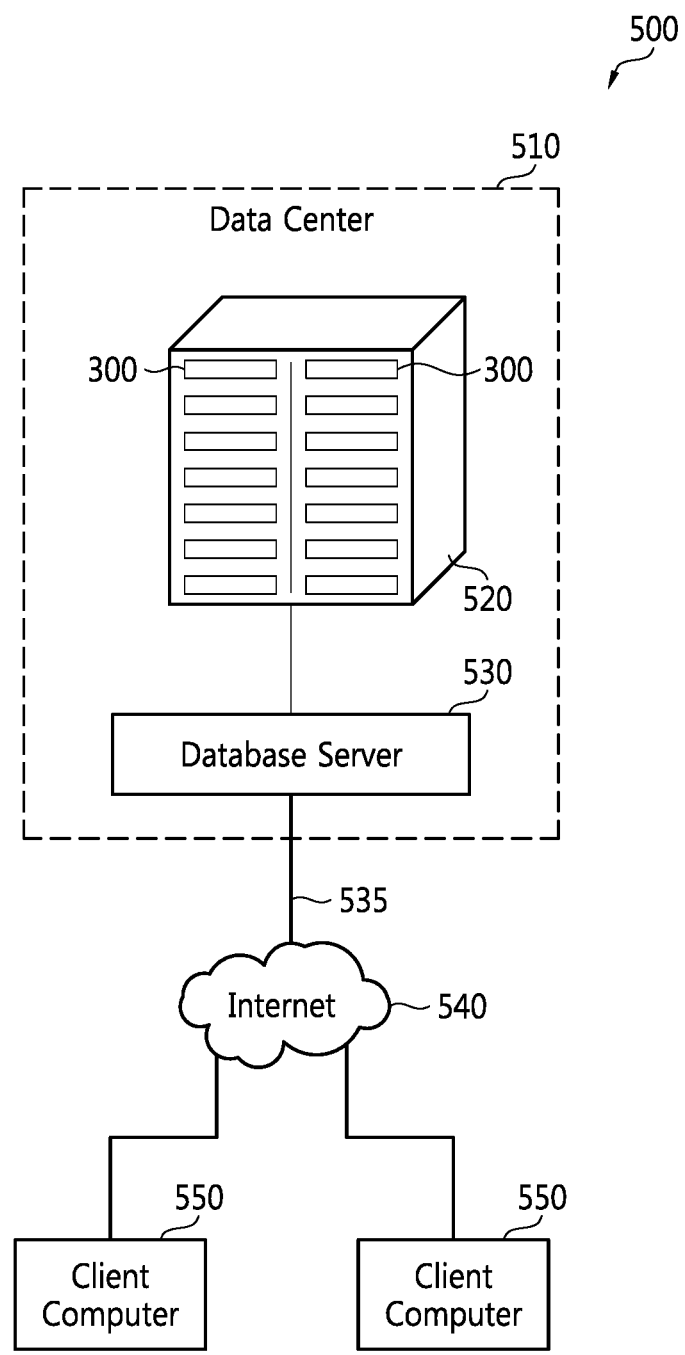
FIG. 14 is a block diagram of a data processing system according to yet another example embodiment of the inventive concepts.

FIG. 14 is a block diagram of a data processing system according to yet another example embodiment of the inventive concepts. Referring to FIGS. 1 through 14, a data processing system 500 may include a database 520, a database server 530, a second network 540, and a plurality of client computers 550 and 551. The database 520 and the database server 530 may be included in a data center 510. The data center 510 may be, for example, an internet data center or a cloud data center.

The database 520 may include a plurality of data storage devices 300. The data storage devices 300 may be installed in racks. Structures and operations of the data storage devices 300 are substantially the same as or similar to those of the data storage device 300-1 or 300-2 described above with reference to FIGS. 1 through 11.

The database server 530 may control the operations of each of the data storage devices 300. The database server 530 may be connected to the second network 540, e.g. an internet, via a first network, e.g. local area network (LAN). The client computers 550 and 551 may be connected to the database server 530 via the second network 540.

As described above, according to some example embodiment of the inventive concepts, a memory controller may mitigate or prevent undesirable successive wear-leveling on one block using a count related to wear-leveling on each of blocks included in an NVM of a data storage device, thereby enhancing performance of the data storage device. Further, the memory controller may select a plane including a block to be subjected to wear-leveling so that a plurality of planes included in the NVM are uniformly selected for wear-leveling, thereby mitigating or preventing undesirable garbage collection. As a result, the performance of the data storage device may be enhanced.

While the inventive concepts have been particularly shown and described with reference to some example embodiments thereof, it will be understood by those of ordinary skill in the art that various changes in forms and details may be made therein without departing from the spirit and scope of the inventive concepts as defined by the following claims.

What is claimed is:
1. A method of operating a memory controller which controls a non-volatile memory including a plurality of blocks, the method comprising:
determining operation counts for the plurality of blocks, the operation counts each including a first count relat- ing to a number of erase operations on a respective block and a second count relating to wear-leveling on the respective block; and avoiding successive wear-leveling on a first block from among the plurality of blocks based on the determined operation count thereof.

2. The method of claim 1, wherein the determining operation counts includes setting a reference value, and the avoiding successive wear-leveling includes preventing wear-leveling on the first block until the second count thereof reaches the reference value.

3. The method of claim 1, further comprising:

increasing the first count of the first block each time an erase operation is performed on the first block; and changing the second count of the first block each time the wear-leveling is performed on the first block.

4. The method of claim 3, wherein the changing the second count of the first block includes increasing the second count of the first block by a reference count.

5. The method of claim 3, wherein the changing the second count of the first block further includes changing the second count each time the erase operation is performed on the first block.

6. The method of claim 5, wherein the changing the second count each time the erase operation is performed on the first block includes decreasing the second count each time the erase operation is performed on the first block.

7. The method of claim 1, further comprising:

selecting a second block having a minimum operation count among the operation counts for the plurality of blocks in response to none of the operation counts of the plurality of blocks reaching a reference value; and controlling execution of wear-leveling on the second block.

8. The method of claim 7, wherein the controlling execution of wear-leveling on the selected block is performed by a flash translation layer (FTL).

9. A data storage device comprising:

a non-volatile memory including a plurality of blocks;

a volatile memory configured to store operation counts for the plurality of blocks, the operation counts including a first count relating to a number of erase operations and a second count relating to wear-leveling; and a memory controller electrically connected with the non-volatile memory and the volatile memory and configured to determine an operation count for a first block among the plurality of blocks and avoid successive wear-leveling on the first block based on a determined operation count thereof.

10. The data storage device of claim 9, wherein the memory controller is further configured to determine whether the second count of a block from among the plurality of blocks is equal to a reference value, and prevent the wear-leveling on the block until the second count is equal to the reference value.

11. The data storage device of claim 9, wherein the memory controller is further configured to increase the first count each time in response to an erase operation performed on a block from among the plurality of blocks, and increase the second count of the block by a reference count in response to the wear-leveling performed on the block.

12. The data storage device of claim 11, wherein the memory controller is further configured to decrease the second count of the block each time in response to the erase operation performed on the block.

13. A method of operating a memory controller which controls a non-volatile memory including a plurality of blocks, the method comprising:

determining operation counts with respect to the plurality of blocks, each of the operation counts including a first count and a second count, the first count relating to a number of erase operations on a corresponding one of the plurality of blocks, the second count relating to wear-leveling on the corresponding one of the plurality of blocks;

prohibiting the wear-leveling on a selected block from among the plurality of blocks based on the first count and the second count corresponding to the selected block;

increasing the first count of the selected block each time an erase operation is performed on the selected block; and changing the second count of the selected block each time wear-leveling or an erase operation is performed on the selected block.

14. The method of claim 13, wherein the changing the second count of the selected block includes increasing the second count by a reference count each time the wear-leveling is performed on the selected block.

15. The method of claim 14, wherein the changing the second count of the selected block includes decreasing the second count each time the erase operation is performed on the selected block.

16. The method of claim 13, wherein the prohibiting wear-leveling includes, setting a reference value, and prohibiting the wear-leveling on the selected block based on the second count of the selected block and the reference value.

17. The method of claim 16, further comprising:

selecting a second block having a minimum value from among the operation counts with respect to the plurality of blocks in response to none of the operation counts of the plurality of blocks reaching the reference value, and performing the wear-leveling on the second block.

* * * * *